United States Patent [19]

Weber et al.

[11] Patent Number: 4,609,682

[45] Date of Patent: Sep. 2, 1986

[54] PROCESS FOR THE PRODUCTION OF MOLDINGS

[75] Inventors: Christian Weber; Klaus König, both of Leverkusen; Manfred Schmidt, Dormagen, all of Fed. Rep. of Germany

[73] Assignee: Bayer Aktiengesellschaft, Leverkusen, Fed. Rep. of Germany

[21] Appl. No.: 777,656

[22] Filed: Sep. 19, 1985

[30] Foreign Application Priority Data

Oct. 3, 1984 [DE] Fed. Rep. of Germany ....... 3436163

[51] Int. Cl.$^4$ .............................................. C08G 18/14
[52] U.S. Cl. ................................... 521/117; 521/51; 521/130; 521/172; 528/48; 528/49; 528/74.5; 528/75; 264/51; 264/328.1; 264/328.6; 264/331.19
[58] Field of Search ............... 521/117, 51, 130, 172; 528/48, 49, 74.5, 75; 264/51, 328.1, 328.6, 331.19

[56] References Cited

U.S. PATENT DOCUMENTS

| | | | |
|---|---|---|---|
| 3,037,947 | 6/1962 | Elkin | 260/2.5 |
| 3,356,621 | 12/1967 | Hopkins et al. | 260/2.5 |
| 3,726,952 | 4/1973 | Boder et al. | 264/48 |
| 3,993,606 | 11/1976 | Wulf von Bonin | 260/2.5 |
| 4,024,090 | 5/1977 | Bonin et al. | 260/2.5 |
| 4,033,912 | 7/1977 | Kleinmann et al. | 260/2.5 |
| 4,058,492 | 11/1977 | Bonin et al. | 260/2.5 |
| 4,098,731 | 7/1978 | Bonin et al. | 521/51 |
| 4,218,543 | 8/1980 | Weber et al. | 521/51 |
| 4,254,228 | 3/1981 | Kleinmann et al. | 521/128 |

FOREIGN PATENT DOCUMENTS 3012126 10/1981 Fed. Rep. of Germany .
1365215 8/1974 United Kingdom .

*Primary Examiner*—Maurice J. Welsh
*Attorney, Agent, or Firm*—Gene Harsh; Joseph C. Gil; Lyndanne M. Whalen

[57] ABSTRACT

The present invention relates to a new process for the production of elastomeric polyurethane moldings which may be microcellular having a sealed surface layer and an average density of from 0.8 to 1.4 g/cm$^3$, wherein specific condensation products of ricinoleic acid are used as internal mold release agents.

2 Claims, No Drawings

PROCESS FOR THE PRODUCTION OF MOLDINGS

BACKGROUND OF THE INVENTION

The present invention relates to a new process for the production of elastomeric polyurethane moldings which may be microcellular having a sealed surface layer and an average density of from 0.8 to 1.4 g/cm$^3$, wherein specific condensation products of ricinoleic acid are used as internal mold release agents.

The production of polyurethane-based moldings having self-releasing properties using so-called internal mold release agents is known (c.f. e.g. U.S. Pat. Nos. 3,726,952, 4,033,912, 4,024,090, 4,058,492 and 4,098,731; and, German Offenlegungsschriften Nos. 2,121,670, 2,427,273 and 3,012,126).

The mold release agents described in these prior publications are particularly suitable for the production of polyurethane-based products with a sealed outer skin since they provide the moldings with good to very good self-releasing properties. Example 7 of U.S. Patent 4,024,090 does describe the use of an ester of a hydroxy group containing polydimethyl siloxane and ricinoleic acid as an internal mold release.

However, in general, these agents do not work as well in the production of high-density microcellular elastomeric polyurethane-based moldings. Such moldings are generally produced by reaction injection molding techniques using highly-active catalyst-containing reaction mixtures of organic polyisocyanates, relatively high molecular weight polyhydroxyl compounds and chain-lengthening agents (c.f. e.g. German Auslegeschrift No. 2,622,951). Thus, the problem in the production of such moldings as to satisfactory self-releasing properties remains.

Thus, an object of the present invention was to provide internal mold release agents which are suitable for the mass production of elastomeric moldings (which can be microcellular) with self-releasing properties. This object was achieved according to the invention herein by using specific condensation products of ricinoleic acid with mono- and/or poly-valent alcohols as internal mold release agents. The particularly good suitability of the mold release agents essential to the invention herein was surprising in view of the teachings as provided by German Offenlegungsschrift No. 2,121,670 (British Pat. No. 1,365,215) and German Offenlegungsschrift No. 2,404,310 (U.S. Pat. No. 4,058,492).

German Offenlegungsschrift No. 2,121,670 describes binary and ternary mixtures used as mold release agents in the production of preferably rigid molding foams. Hydroxyl group-containing esters of monocarboxylic acids inter alia are described as being useful as mold release components in the aforementioned mixtures. Long-chain fatty and oleic acids on the one hand and various alcohols on the other are used as components for these esters. The list of suitable fatty acids or oleic acids includes ricinoleic acid. The achievement of the objects of the present invention must, however, be regarded as surprising in view of this disclosure, since (i) the production of elastomeric moldings having high density is not mentioned, (ii) the aforementioned esters should only be used as components in binary or ternary mold release agent systems, and (iii) if ricinoleic acid is used, an alcohol is not necessary.

German Offenlegungsschrift No. 2,404,310 recommends the use of free carboxyl group-containing reaction products of ricinoleic acid with long-chain fatty acids, including free carboxyl group-containing polyricinoleic acids (as may be obtained by autocondensing ricinoleic acid) as internal mold release agents in the production of molded foams of the most varied type. These carboxyl group-containing mold release agents have, however, limited suitability for highly-active systems used in reactive injection molding techniques for the production of elastomeric moldings of high density, since they disturb the sensitive catalysis of these systems. Elastic molded foams of high density having good self-releasing properties can be produced with the mold release agents disclosed by this publication, but unfortunately, the interior walls of the molds have to be cleaned after short intervals of time, since the self-releasing properties otherwise disappear after a few reaction cycles. This is obviously due to the moldings not completely reacting on the surface within the requisite short reaction times, with the result that impurities form on the interior wall of the mold after a few reaction cycles. These impurities rapidly suppress the releasing effect of otherwise good mold release agents.

DESCRIPTION OF THE INVENTION

Thus, the present invention is directed to a process for the production of elastomeric moldings (which may be microcellular) having an average density of from 0.8 to 1.4 g/cm$^3$ and a sealed surface layer having self-releasing properties comprising, reacting in closed molds, a reaction mixture comprising
  (a) organic polyisocyanates and
  (b) solutions of
  (1) chain-lengthening agents, selected from the group of (i) alkane diols having molecular weights of from 62 to 400, and which may contain ether groups, (ii) aromatic diamines having molecular weights of from 108 to 400 and (iii) mixtures of components (i) and (ii), in
  (2) polyhydroxyl compounds with average molecular weights of from 1800 to 12,000 and average hydroxyl functionalities of from 2 to 3, provided that mixtures of various polyhydroxyl compounds may be used as component (b)(2), in which the individual components may have molecular weights of more than 400 and less than 1800 and/or hydroxyl functionalities of more than 3,
  (c) catalysts for the isocyanate polyaddition reaction,
  (d) internal mold release agents, and optionally,
  (e) further auxiliaries and additives, characterized in that component (d) comprises ester group-containing condensation products having an osmometrically-determinable average molecular weight of from 900 to 4500, an acid number of less than 5 and a hydroxyl number of from 12.5 to 125, said condensation product being produced from 3 to 15 mols of ricinoleic acid and one mol of one or more mono- or poly-valent alcohols having molecular weights of from 32 to 400 and wherein component (d) is used in a quantity of from 0.3 to 30% by weight based on the total quantity of reaction mixture.

Starting materials (a) for the process according to the invention include any organic polyisocyanates, e.g., such as those disclosed in German Pat. No. 2,404,310, column 3, line 39 to column 4, line 56. Organic polyisocyanates having only aromatically bound isocyanate groups and having an average NCO functionality of from 2 to 2.3 are preferably used. The most preferred polyisocyanates include polyisocyanates or polyisocyanate mixtures of the diphenyl methane series which are liquid at room temperature, including mixtures of 4,4'-diisocyanatodiphenyl methane and 2,4'-diisocyanatodiphenyl methane and optionally relatively high functional homologs of these diisocyanates which are liquid at room temperature; carbodiimide- or uretonimine-modified derivatives of these diisocyanates or polyisocyanate mixtures which are liquid at room temperature; urethane-modified derivatives of these diisocyanates or polyisocyanate mixtures which are liquid at room temperature, particularly those of the type described in German Offenlegungsschrift No. 2,624,526; and liquid reaction products of 1 mol of 4,4'-diisocyanatodiphenyl methane with from 0.05 to 0.3 mols of one or more relatively low molecular weight diols or triols, preferably polypropylene glycols having molecular weights of up to 700, as obtained, for example, according to German Offenlegungsschrift No. 618,380.

Component (b)(1) is a chain-lengthening agent of known type, that is (i) alkane diols having molecular weights of from 62 to 400, and which may contain ether groups, (ii) aromatic diamines having molecular weights of from 108 to 400 or (iii) mixtures of such chain-lengthening agents.

The following are examples of chain-lengthening agents (i) which can be used: ethylene glycol, 1,2-dihydroxypropane, 1,3-dihydroxypropane, 1,4-dihydroxybutane, 1,6-dihydroxyhexane, 1,8-dihydroxyoctane, neopentyl glycol, diethylene glycol, triethylene glycol, tetraethylene glycol, dipropylene glycol, dibutylene glycol, tripropylene glycol or mixtures of such diols.

Suitable chain-lengthening agents (ii) include any (preferably primary) amino group-containing aromatic diamines having molecular weights of from 108 to 400. Most preferred are diamines which contain only aromatically bound (preferably primary) amino groups. The following are examples of suitable diamines, 1,4-diamino-benzene, 2,4-diaminotoluene, 2,4'- and/or 4,4'-diaminodiphenyl methane, 3,3'-dimethyl-4,4'-diaminodiphenylmethane or 4,4'-diaminodiphenyl-propane-(2,2), or any mixtures of such diamines.

The most preferred diamines used in the process according to the invention are, however, those which have at least one alkyl substituent in the ortho positions with respect to the amino groups, particularly those diamines which have at least one alkyl substituent in the ortho position with respect to the first amino group and two alkyl substituents, each having from 1 to 4, preferably from 1 to 3 carbon atoms, in the ortho position with respect to the second amino group. Most preferred, are those diamines which have an ethyl, n-propyl and/or isopropyl substituent in each case in at least one ortho position with respect to the amino groups and optionally methyl substituents in further ortho positions with respect to the amino groups. The following are examples of particularly preferred diamines: 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminodiphenyl methane, 3,5-diethyl-3',5'-diisopropyl-4,4'-diaminodiphenyl methane, 1,3-dimethyl-5-tert.-butyl-4,6-diamino-benzene or 1,3-dimethyl-5-tert.-butyl-2,6-diamino-benzene or mixtures of such diamines. 1-methyl-3,5-diethyl-2,4-diaminobenzene and the commercial mixtures thereof with 1-methyl-3,5-diethyl-2,6-diamino-benzene are particularly preferred.

According to one particularly preferred embodiment of the process of the invention, the diamines given for example in (ii) are used as the sole component (b)(1).

The component (b)2) includes organic polyhydroxyl compounds having average molecular weights, calculable from the functionality and the hydroxy group content, of from 1800 to 12,000, preferably from 3000 to 7000 and average hydroxyl functionalities of from 2 to 3, preferably 3. Mixtures of various polyhydroxyl compounds are often used as component (b)(2). It is also possible that individual components of such mixtures have molecular weights of more than 400 and less than 1800 and/or hydroxyl functionalities of more than 3, provided that the average molecular weights and functionalities of the resultant mixtures are within the ranges noted above.

Suitable polyhydroxyl compounds include polyesterpolyols and preferably polyether-polyols known from polyurethane chemistry, as disclosed, for example, in U.S. Pat. No. 4,218,543, column 7, line 29 to column 8, line 55.

The "polyol component" (b), which is a solution of the chain-lengthening agents (b)(1) in the relatively high molecular weight polyhydroxyl compounds (b)(2), serves as a reaction constituent for the polyisocyanate component (a). The component (b)(1) is dissolved in component (b)(2) in a quantity of from 5 to 50% by weight, preferably from 8 to 35% by weight, based on the quantity of component, (b)(2), or is combined with component (b)(2) to produce a mixture which is liquid at room temperature.

In carrying out the process according to the invention, catalysts for the isocyanate polyaddition reaction must be used as component (c).

The preferred catalysts include the known tin catalysts, such as tin(II) salts of carboxylic acids, such as tin(II)-acetate, tin(II)-octoate, tin(II)-ethylhexoate and tin(II)-laurate and the dialkyl-tin salts of carboxylic acids, such as dibutyl tin diacetate, dibutyl tin-dilaurate, dibutyl tin-maleate or dioctyl tin-diacetate, on their own or as a complex with amidines, such as 2,3-dimethyl-3,4,5,6-tetrahydropyrimidine or 2-methyl-3-cyclohexyl-3,4,5,6-tetrahydropyrimidine, aminopyridines or -pyrimidines and hydrazinopyridines or -pyrimidines. Synergistically-acting catalyst combinations of this type are described, for example, in the German Offenlegungsschriften Nos. 2,434,185, 2,601,082 and 2,603,834. The following are examples of tertiary amines of known type which can also be used as catalysts: triethylamine, tributylamine, N-methyl-morpholine, N-ethyl-morpholine, N-cocomorpholine, N,N,N',N'-tetramethyl-ethylene diamine, 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-β-phenylethylamine, 1,2-dimethylimidazole and 2-methylimidazole. The most preferred catalyst of this type is 1,4-diazabicyclo-(2,2,2)-octane. Further examples of catalysts to be used according to the invention and details about the effect of the catalysts are known and are given, e.g., in the Kunststoff-Handbuch, Vol. VII, published by Vieweg and Höchtlen, Carl Hanser Verlag, Munich 1966, on pages 96 to 102.

The catalysts are generally used in a quantity of from 0.001 to 10, preferably from 0.05 to 1% by weight, based on the quantity of component (b)(2). In carrying out the process of the invention, they are preferably dissolved in component (b)(2) together with component (b)(1).

Component (d) which is essential to the invention consists of ester group-containing reaction products of from 3 to 15, preferably from 5 to 10 mols, of ricinoleic acid with (i) 1 mol of a mono or poly-valent alcohol having a molecular weight of from 32 to 400, preferably from 62 to 400, or, with (ii) in total, one mole of a mixture of several such alcohols. The ester group-containing reaction products have an osmometrically determinable molecular weight of from 900 to 4500, an acid number of less than 5 (preferably less than 3), and a hydroxyl number of from 12.5 to 125 (preferably from 20 to 75), and are generally in the form of oily liquids with a viscosity of from 200 to 3000 mPas at 25° C.

Any alcohols within the aforementioned molecular weight range, that is any such alkanols or cycloalkanols (which can also contain ether groups), can be used to produce the mold release agents (d) which are essential to the invention. Examples include methanol; ethanol; n-hexanol; n-dodecanol; n-octadecanol; the diols described for use as component (b)(1)(i) above, cyclohexanol; 1,4-dihydroxycyclohexane; glycerin; trimethylolpropane; and the like. Mixtures of such alcohols can also be used. Alkane diols having molecular weights from 62 to 400 of the type described for use as component(b)(1)(i) are preferably used as the alcohol component in the production of the mold release agents. Ethylene glycol; 1,2- and 1,3-dihydroxypropane; 1,2-1,3-, 1,4- or 2,3-dihydroxybutane; neopentyl glycol; 1,4-bis-hydroxymethyl-cyclohexane; 1,8-dihydroxyoctane are more preferably used, with 1,6-dihydroxyhexane being the most preferred alcohol component in the production of the mold release agents.

The mold release agents (d) essential to the invention are produced by known esterification reactions, such as by heating the starting materials in the presence of catalytic quantities of a Lewis acid or Brönsted acid, such as sulfuric acid, p-toluene sulphonic acid, acidic ion exchangers, tin dichloride or titanium tetrabutylate, under a pressure of from about 1000 to 0.1 mbars, to a temperature of up to 220° C., preferably up to 180° C. while simultaneously removing the water produced in the condensation reaction. The mold release agents can, of course, be produced equally well by the azeotrope process in the presence of an organic solvent, such as toluene, as an entrainer or by the carrier gas process, that is by expelling the water produced with an inert gas, such as nitrogen or carbon dioxide.

The mold release agents (d) essential to the invention can be incorporated into the polyisocyanate component (a) or into the polyol component (b). In the first case, the mold release agents are added to the polyisocyanate component (a) at an elevated temperature of, for example, from 30° to 100° C. with the result that the mold release agents react with a part of the polyisocyanate with the formation of urethane. Since the hydroxyl group-containing mold release agents normally react during production of the moldings with a part of the polyisocyanate component and are thus finally present in the molding in a chemically-incorporated form, the second mentioned variant leads to virtually the same end result.

The mold release agents (d) essential to the invention are generally used in a quantity of from 0.3 to 30, preferably from 1 to 10% by weight, based on the entire reaction mixture.

Further auxiliaries and additives (e) can optionally be simultaneously used in carrying out the process according to the invention. These include, for example:

blowing agents, such as water and/or volatile organic materials, such as acetone, ethylacetate, methyl chloride, chloroform, butane or particularly fluorine-chlorine hydrocarbons, such as monofluorotrichloromethane, chlorodifluoromethane and/or dichlorodifluoromethan;

surface-active additives (emulsifiers and foam-stabilizers), such as the sodium salts of ricinol sulphonates or of fatty acids; or, salts of fatty acids having amines, such as diethylamine of oleic acid or diethanol amine of stearic acid; alkali metal or ammonium salts of sulphonic acids, such as of dodecyl benzene sulphonic acid or dinaphthylmethane sulphonic acid or of fatty acids, such as ricinoleic acid or of polymeric fatty acids; or foam stabilizers of the type described for example in U.S. Patent No. 2,764,565;

cell regulators of known type, such as paraffins or fatty alcohols or polydimethylpolysiloxanes;

pigments, dyes or flameproofing agents of known type; stabilizers against aging and the effects of weathering; plasticizers; fungistatically or bacteriostatically-active materials;

fillers, such as barium sulphate, kieselguhr, carbon black, glass fibers or prepared chalk.

Low molecular weight, relatively high functional alcohols, such as glycerin, trimethylol propane or sorbitol, can also be used together with the chain-lengthening agents (b)(1) for the purpose of obtaining in certain cases desirable branching of the molecules.

In carrying out the process according to the invention, the quantity of the polyisocyanate component (a) is preferably calculated in such a manner that there is an isocyanate index of from 70 to 130, particularly from 90 to 110 in the foamable mixture. Isocyanate index is understood, in this context, to designate the quotient of the number of isocyanate groups and the number of isocyanate-reactive groups, multiplied by 100.

In carrying out the process according to the invention, known reaction injection molding techniques (RIM process) are used in particular. The quantity of mixture introduced into the mold is calculated in such a manner that the molding has an average total density of from 0.8 to 1.4 g/cm$^3$, preferably from 0.9 to 1.2 g/cm$^3$ Moldings with a density of more than 1.2 g/cm$^3$ are produced particularly if mineral fillers are also used. The moldings can be removed from the mold after a setting resp. mold standing time of from 5 to 90, and preferably from 20 to 60 seconds.

A temperature of from 10° to 50° C., preferably from 20° to 40° C. is selected as the starting temperature of the mixture introduced into the mold. The temperature of the mold is from 40° to 100° C., preferably from 50° to 70° C.

Due to the use of the mold release agents (d), the process of the invention allows the problem-free mass production of elastomeric optionally microcellular moldings of high density, without it being necessary to clean the molds used after short periods of time. The excellent self-releasing properties of the resultant products are maintained (as seen from the examples) for at least 30 reaction cycles.

Fundamentally it is of course possible to use further mold release agents of known type in addition to the mold release agents (d). Typical examples of such release agents are metal salts of long chain carboxylic acids especially zinc stearate.

The products produced are particularly suitable for the production of flexible automobile bumpers or of flexible bodywork elements. However, flexible shoe soles with good abrasion behavior and excellent mechanical strength, for example, can also be obtained by suitably varying the starting materials, particularly with a small quantity of diamine chain-lengthening agents of the type given, for example, in (b)(2).

The invention is further illustrated but is not intended to be limited by the following examples in which all parts and percentages are by weight unless otherwise specified.

A. Production of the Mold Release Agents According to the Invention

EXAMPLE 1

303 kg of ricinoleic acid (1017 mols), 40 kg of 1,6-dihydroxyhexane (339 mols) and 2.5 kg of p-toluene sulphonic acid are placed in a 500 liter tank and heated to 180° C. The resulting water is drawn off over a period of 4 hours via a packed column under ambient pressure. The pressure is subsequently slowly reduced to 20 mbars and further reaction water is drawn off. All the water (18.3 kg) which contains small amounts of organic constituents distills off over the following 7.5 hours. The mixture is maintained for a further 1 hour at 20 mbars and then cooled. The resulting ester group-containing condensation product can be used as such as the mold release agent. This is a liquid with a viscosity (25° C.) of 630 mPas, has an acid number of 2.5 and has a hydroxyl number of 74. The yield is 321 kg (98% of theoretical yield).

EXAMPLE 2

284 kg (953 mols) of ricinoleic acid, 16 kg (135.6 mols) of 1,6-dihydroxyhexane and 15 g (50 ppm) of titanium tetrabutylate are reacted in a 500 liter tank according to Example 1. After the water has distilled off, a mold release agent having the following characteristics is obtained in a 98.5% yield:

| acid number: | 2.0 |
| hydroxy number: | 35 |
| viscosity (25° C.): | 920 mPas |

EXAMPLE 3

298 kg (1000 mols) of ricinoleic acid, 10 kg (111.1 mols) of 1,4-dihydroxybutane and 3 kg of p-toluene sulphonic acid are reacted according to Example 1 and the resulting water is distilled off. The resulting mold release agent is produced in a 96% yield and has the following characteristics:

| acid number: | 3.1 |
| hydroxyl number: | 28 |
| viscosity (25° C.): | 1650 mPas |

EXAMPLE 4

640 g (3.3 mols) of tetraethylene glycol and 6884 g (23.1 mols) of ricinoleic acid are reacted according to Example 1. Catalysis is carried out using 50 ppm of titanium tetrabutylate. The resulting reaction water is drawn off over a period of 20 hours. The resulting mold release agent is produced in a 97% yield and has the following characteristics:

| acid number: | 2.3 |
| hydroxyl number: | 30 |
| viscosity (25° C.): | 990 mPas |

EXAMPLE 5

11.5 kg of a commercial polyethylene glycol with an average molecular weight of 370 are reacted according to Example 4 with 64.7 kg of ricinoleic acid in the presence of 3 g of titanium tetrabutylate. The mold release agent, produced in a 97.5% yield, has the following characteristics:

| acid number: | 2.8 |
| hydroxyl number | 30.1 |
| viscosity (25° C.): | 1010 mPas |

B. Use Examples

The formulations described in the following examples are processed via the reaction injection molding (RIM) technique.

The polyol mixture and polyisocyanate are supplied (and where indicated, the mold release agent) to a high pressure metering apparatus and, after intensive mixing in a force-controlled mixing head, are rapidly injected into a metal mold.

The mold—a key shape of tool steel—allows the production of a molding having the following dimensions.

| Outer diameter base | 178 mm |
| Outer diameter periphery | 186 mm |
| Wall thickness | 4 mm |
| Height of molding | 68 mm |
| Conicity | 3.50 |

Feed head: feed head source, centrally on the base ($\phi = 10$ mm)

Substantial shearing forces on the wall surfaces have to be overcome on removal of the key.

The effectiveness of the internal mold release agents is tested by removing materials of different rigidity from the mod (in Examples 6 to 8 the flexural modulus at RT is about 300 MPa, and in Examples 9 to 11 the flexural modulus is about 175 MPa).

EXAMPLE 6

(Comparison)

77.00 parts by weight of a polyether with an OH number of 28, which is obtained by addition of propylene oxide and subsequent addition of ethylene oxide to trimethylol propane (weight ratio PO:EO =83:17), 23.00 parts by weight of a mixture of 65 parts by weight of 1-methyl-3,5-diethylphenylene diamine-(2,4) and 35 parts of 1-methyl-3,5-diethylphenylene diamine-(2,6)
0.10 parts by weight of dibutyl tin dilaurate and
0.10 parts by weight of 1,4-diazabicyclo-(2,2,2)-octane are combined to produce a polyol component and are processed with 57.00 parts by weight of a polyisocyanate, having an NCO content of 24.5% and which is obtained by reacting a mixture of a) 90 parts by weight of 4,4'-diphenylmethane diisocyanate, containing from 5 to 10% of 2,4'-isomer, and b) 10 parts by weight of oligomeric polyphenyl polymethylene polyisocyanate, with a commercial polypropylene glycol having an average molecular weight of 224.

The temperature of the crude materials is 35° C., and the temperature of the mold is 60° C. The mold standing time is adjusted to 20 sec and the cycle time is adjusted to 60 sec. The surface of the mold is treated before production of the first molding with a commercial mold release agent (Fluoricon 36-134, manufactured by Acmos Chemische Fabrik Tietjen & Co., 2800 Bremen 1, P.O. Box 833). 8 moldings can be removed from the mold, but further removals from the mold lead to the destruction of the molding.

EXAMPLE 7

(according to the invention)

7.00 parts by weight of a polyether having an OH number of 28 according to Example 6,
23.00 parts by weight of the diamine mixture according to Example 6,
0.10 parts by weight of dibutyl tin dilaurate,
0.10 parts by weight of 1,4-diazabicyclo-(2,2,2)-octane and
7.50 parts by weight of the internal mold release agent according to Example 2
are combined to produce a polyol component and are processed with
53.00 parts by weight of the polyisocyanate from Example 6 according to the RIM process.

The processing conditions are selected as in Example 6.

25 moldings can be released from the mold in a problem-free manner, and the build-up of a troublesome layer on the surface of the mold is not observed.

EXAMPLE 8

(Comparison)

77.00 parts by weight of a polyether having an OH number of 28 according to Example 6,
23.00 parts by weight of the diamine mixture according to Example 6,
0.10 parts by weight of dibutyl tin dilaurate,
0.10 parts by weight of 1,4-diazabicyclo-(2,2,2)-octane and
7.50 parts by weight of an ester (German Offenlegungsschrift 2,121,670) consisting of 1 mol of adipic acid, 6 mols of oleic acid and 3 mols of pentaerythritol (hydroxyl number about 50)
are combined to produce a polyol component and processed with 53.00 parts by weight of the polyisocyanate from Example 6. The processing conditions are adjusted as in Example 6.

Only 8 moldings can be removed from the mold. Further removals lead to destruction of the molding.

EXAMPLE 9

(Comparison)

81.80 parts by weight of a polyether having an OH number of 28 according to Example 6,
18.00 parts by weight of the diamine mixture according to Example 6,
0.10 parts by weight of dibutyl tin dilaurate and
0.10 parts by weight of 1,4-diazabicyclo-(2,2,2)-octane are combined to produce a polyol component and are processed with
47.00 parts by weight of a reaction product of tripropylene glycol and 4,4'-diphenylmethane diisocyanate (23% by weight NCO) according to the RIM process.

The temperature of the crude materials is 35° C., the temperature of the mold is 70° C. The setting time is adjusted to 20 sec and the cycle time is adjusted to 60 sec. The surface of the mold is treated with the mold release agent Chem Trend XMR 136, available from Chem-Trend International, 3205 E. Grand River, Howell, Michigan 48843, before production of the first molding. Even after 3 releases from the mold, the tearing force is so great that further moldings can only be removed from the mold with substantial deformation.

EXAMPLE 10

(according to the invention)

76.10 parts by weight of a polyether having an OH number of 28 according to Example 6,
16.70 parts by weight of the diamine mixture according to Example 6,
0.10 parts by weight of dibutyl tin dilaurate,
0.10 parts by weight of 1,4-diazabicyclo-(2,2,2)-octane and
7.00 parts by weight of the mold release agent according to Example 2 of the present invention
are combined to produce a polyol component and are processed with 42.3 parts by weight of a reaction product of tripropylene glycol and 4,4'-diphenylmethane diisocyanate (23% NCO) by the RIM process.

The processing conditions are selected as in Example 9. 30 moldings can be removed from the mold in a problem-free manner without deformation of the moldings.

EXAMPLE 11

(Comparison)

76.10 parts by weight of a polyether having an OH number of 28 according to Example 6,
16.70 parts by weight of the diamine mixture according to Example 6,
0.10 parts by weight of dibutyl tin dilaurate
0.10 parts by weight of 1,4-diazabicyclo-(2,2,2)-octane and
7.00 parts by weight of the ester from Example 8
are combined to produce a polyol component and are processed with 56.00 parts by weight of a reaction product of tripropylene glycol and 4,4'-diphenylmethane diisocyanate (23% by weight NCO) by the RIM process.

The processing conditions are selected as in Example 9. Only 5 moldings can be released from the mold. Further moldings are substantially deformed.

EXAMPLE 12

77.0 parts by weight of the polyether having an OH number of 28 according to Example 6,
23.0 parts by weight of the diamine mixture according to Example 6,
0.1 parts by weight of dibutyl tin dilaurate,
0.1 parts by weight of 1,4-diazabicyclo-(2,2,2)-octane and
7.5 parts by weight of the mold release agent according to Example 4 of the present invention
are combined to produce a polyol component and are processed with
53.0 parts by weight of the polyisocyanate according to Example 6 by the RIM process.

The processing conditions are selected as in Example 6.

20 moldings can be removed from the mold in a problem-free manner and without a troublesome layer building up on the surface of the mold.

EXAMPLE 13

77,0 parts by weight of polyether having an OH-number of 28 according to Example 6,
2,0 parts by weight of a polyether polyol having an OH-number of 630, obtained by propoxylation of ethylene diamine,
21,0 parts by weight of the diamine mixture according to Example 6,
0,1 parts by weight of dibutyl tin dilaurate,
0,1 parts by weight of 1,4-diazabicyclo-(2,2,2)-octane and
a solution of 1,5 parts by weight of zinc stearate in 7,0 parts by weight of the mold release agent according to Example 2 are combined to form a "polyol component".

This "polyole component" is processed with 53 parts by weight of the polyisocyanat according to Example 6 by the RIM process.

The temperature of the crude materials is 35° C., and the temperature of the mold is 60° C. The mold standing time is adjusted to 20 sec and the cycle time is adjusted to 60 sec. The surface of the mold is treated before production of the first molding with a commercial mold release agent (Frekote ® X 5, Frekote Inc., 170 W Spanish river Blvd., Boca Raton, F 1 33431/USA).

50 moldings can be removed from the mold in a problem-free manner without building up of the least residues on the inner walls of the mold.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an elastomeric molding having average density of from 0.8 to 1.4 g/cm$^3$ and of a sealed surface layer reacting a reaction mixture in a closed mold, said reaction mixture comprising:
   (a) an organic polyisocyanate and
   (b) a solution of
      (1) a chain-lengthening agent, selected from the group consisting of (i) alkane diols having a molecular weight of from 62 to 400, which may contain ether groups, (ii) aromatic diamines having molecular weights of from 108 to 400 and (iii) mixtures of (i) and (ii), in
      (2) a polyhydroxyl compound having an average molecular weight of from 1800 to 12,000 and an average hydroxyl functionality of from 2 to 3, provided that polyhydroxyl compounds having molecular weights of more than 400 and less than 1800 and/or hydroxyl functionalities of more than 3, can be used so long as the average molecular weight of the resultant mixture is from 1800 12,000 and the average hydroxyl functionality of the resultant mixture is from 2 to 3.
   (c) catalyst for the isocyanate polyaddition reaction, and
   (d) an internal mold release agent
characterized in that component (d) comprises an ester group-containing condensation product with an osmometrically-determinable average molecular weight of from 900 to 4500, an acid number of less than 5 and a hydroxyl number of from 12.5 to 125, which product is produced from 3 to 15 mols of ricinoleic acid and either one mol of a mono- or poly-valent alcohol having a molecular weight of from 32 to 400 or one mol of a mixture of several such alcohols, said release agent being used in a quantity of from 0.3 to 30% by weight based on the total quantity of the reaction mixture.

2. A process according to claim 1, characterized in that component (d) comprises an ester group-containing reaction product of ricinoleic acid with an alkane diol having molecular weights of from 62 to 400.

* * * * *